(12) United States Patent
Aldenderfer

(10) Patent No.: US 12,122,987 B2
(45) Date of Patent: Oct. 22, 2024

(54) ACCELERATED AGING OF ALCOHOLIC BEVERAGES

(71) Applicant: Matthew T Aldenderfer, Central, SC (US)

(72) Inventor: Matthew T Aldenderfer, Central, SC (US)

( * ) Notice: Subject to any disclaimer, the term of this patent is extended or adjusted under 35 U.S.C. 154(b) by 309 days.

(21) Appl. No.: 17/647,110

(22) Filed: Jan. 5, 2022

(65) Prior Publication Data

US 2023/0002707 A1   Jan. 5, 2023

Related U.S. Application Data

(60) Provisional application No. 63/216,756, filed on Jun. 30, 2021.

(51) Int. Cl.
  *C12H 1/22* (2006.01)
  *C12G 3/07* (2006.01)
(52) U.S. Cl.
  CPC .......... *C12H 1/22* (2013.01); *C12G 3/07* (2019.02)
(58) Field of Classification Search
  CPC .................................. C12H 1/22; C12G 3/07
  See application file for complete search history.

(56) References Cited

U.S. PATENT DOCUMENTS

| 2001/0018086 A1* | 8/2001 | Gross, II | C12G 3/07 |
| | | | 426/418 |
| 2010/0089943 A1* | 4/2010 | Till | B67D 3/0006 |
| | | | 222/61 |
| 2012/0164300 A1* | 6/2012 | Niazi | C12H 1/063 |
| | | | 99/277.2 |
| 2020/0255777 A1* | 8/2020 | Fearnside | C12H 1/16 |

FOREIGN PATENT DOCUMENTS

| CN | 213295296 U | * | 5/2021 | |
| WO | WO-2011114331 A2 | * | 9/2011 | ............. C12G 3/065 |
| WO | WO-2018002549 A1 | * | 1/2018 | ............. G01N 21/25 |
| WO | WO-2022248888 A1 | * | 12/2022 | ............. C12G 3/06 |

* cited by examiner

*Primary Examiner* — Jyoti Chawla
(74) *Attorney, Agent, or Firm* — Southeast IP Group LLC; Thomas L. Moses

(57) ABSTRACT

A process for the accelerated aging and integrated flavoring of alcoholic beverages with selective control over the final flavor profile is described using size-reduced wood and plant-based biomass products in a rapidly-recirculating system at or above atmospheric pressure with the availability of gaseous, liquid, or solids introduction and accentuated by solids sonication and/or ultrasonically-enhanced alcoholic beverage homogenization and/or chemical reactions and with a much-reduced consumption of wood and plant-based biomass.

17 Claims, 7 Drawing Sheets

ACCELERATED AGING OF ALCOHOLIC BEVERAGES

CROSS-REFERENCE TO RELATED APPLICATIONS

The present application is a non-provisional of U.S. Provisional Patent Application Ser. No. 63/216,756, entitled Accelerated Aging of Alcoholic Beverages filed on Jun. 30, 2021. The foregoing provisional patent application is hereby incorporated herein by reference in its entirety.

BACKGROUND

Processes for aging, flavoring, and maturation of various alcoholic beverages using new or used oak barrels in a charred or uncharred state are well-known and widespread throughout the alcoholic beverage industry. Many alcoholic beverages such as (but not limited to) wines, beers, ports, liqueurs, and various spirits use this process to impart desirable flavors, remove undesirable compounds, impart color, and add chemical species for subsequent reactions for greater flavor and aroma.

The following references serve as examples of various processes for aging of alcoholic beverages, and are hereby incorporated herein by reference:

U.S. Application No. 20120164300 Accelerated Aging of Wines and Sprits

A method and a system for aging wines and spirits is disclosed using finely pulverized wood of less than 1 mm size and in such quantity to achieve equivalent aging in one-tenth to one-hundredth of the time required for traditional barrel aging and for instant aging prior to drinking.

U.S. Application No. 20010018086 All Natural Accelerated Aging of Distilled Spirits A process for producing an aged beverage, preferably a distilled spirit that is aged in contact with wood, in which raw or partially aged beverage is processed in a closed system with controlled heat and oxygen levels, and in contact with a beverage aging wood product. In certain embodiments ethyl acetate is added to the raw beverage prior to the aging process.

U.S. Application No. 20190177675 Apparatus and Method for Aging Wine

System for maturation of wine comprises a tank and one or more wooden barrels and flow connectors to allow circulation of maturing wine between the tank and the one or more barrels. The barrels may comprise a wooden exterior and an internal volume and a plurality of internal wooden surfaces extending inwardly of the wooden exterior into the internal volume to increase wood surface area. The barrel may be a traditional oak barrel.

U.S. Application No. 20160289619 Aging of Alcoholic Beverages Using Controlled Mechanically Induced Cavitation An extreme acceleration of the process of aging spirits to obtain aged liquors includes circulating the spirits through a cavitation zone within a controlled cavitation reactor and exposing the spirits therein to high energy cavitation induced shockwaves. Sources of flavor and color such as charred wood chips may be added to the spirits to provide the color and flavor of liquors aged for years in traditional charred oak barrels. The method and apparatus of the present invention obtains the same conversion of undesirable alcohols, flavor extraction, and color as years of aging in an oak barrel but does so in a matter of minutes or hours. The apparatus and method also can be used in conjunction with traditional aging techniques and methods and the total aging time is still reduced dramatically.

Russian Patent No. RU2432391C2 Method for Production of Base for Preparation of Strong Alcoholic Beverages SUBSTANCE: one produces an extract by way of uninterrupted recirculation of a water-alcohol solution at a temperature of 50-55° C. through a raw wood layer during 4 days. The water-alcohol solution is represented by distillate of a mixture of barley, rye malts and corn at a ratio of 1:1:1 with volume fraction of ethanol 60-65 vol. %. The base is maintained without chips during 10 days.

EFFECT: invention allows to enhance quality of the ready product due to improvement of organoleptic and physico-chemical properties of the base for preparation of strong alcohol beverages.

South Korean Patent No. KR20020082305A Method to Manufacture Alcoholic Drink Using Oak Charcoal The method for producing liquor using black oak charcoal comprises the steps of: passing water for liquor through a column packed with the black oak charcoal or dipping the black oak charcoal in the water for liquor and filtering it; diluting alcohol with the black oak charcoal treated water to the alcohol concentration being 10 to 45% (v/v); passing the diluting alcohol through a column packed with the black oak charcoal or dipping the black oak charcoal in the diluting alcohol and filtering it; adding 50 to 200 ppm of activated carbon into the filtered diluted alcohol, stirring it for 3 hours, and passing it over a diatom to remove offensive smell; adding additives into the diluted alcohol; adding the water for liquor into the blending diluted alcohol to adjust its alcohol concentration; and adding 10 to 30 ppm of activated carbon into the diluted alcohol, stirring it for 2 hours, and filtering it with 0.3 to 0.8 micrometer filter paper.

French Patent No. FR2712300A Pumping Wine of Brandy Through Wooden Barrel From Vessel Wine or brandy contained in a vessel (8) is circulated and allowed to rest in a wooden barrel (3). Wine is pumped slowly (2) from the vessel (4) to the barrel (5), then back to the vessel (6) under control of an automatic programmable controller (1). The entire device is separate from the wine storage vessel. A single pump may be used to feed one or more barrels in series. The integral controller regulates the wine's residence time in the barrels before return to the vessel. Other machines may be linked to the device.

French Patent No. FR3098578A Aging Accelerator Exchanger

The device relates to a tool for reducing the aging time of alcohol. The invention makes it possible to treat large volumes, to stop and restart the aging process at will of several tanks of alcohol alternately. It consists of a frame with a fixed part (15) and a mobile part (16) sandwiching a set of wooden plates (2), wine plates (3) and air plates (4). It has a double network which makes it possible to circulate (11-12) the wine in contact on one face of each of the wooden plates (2) and to circulate (13-14) pressurized air in contact on the opposite side of each of the wooden plates without ever mixing with the wine circuit. The tool allows the aging of wine, or any other type of alcohol whose wood provides added value. Figure for the abstract: FIG. 1

United Kingdom Patent No. GB500081A Method of Aging Whiskey

Whisky is aged by brining it into contact with finely divided wood which has been impregnated with whisky, preferably that obtained from internally charred oaken barrels—which have held aged whisky. The whisky is preferably heated and air is blown through it during treatment. As shown, vessels 4, 5, 6 and barrel 3 hold perforated containers 4, 5, 6 and 9 in which the wood is held and through any or, all of which the whisky is, pumped. The barrel 3 may be a new barrel and thus be quickly "aged" and may contain new wood to be rapidly made usable in the process described.

There are many disadvantages associated with this traditional manner of beverage aging. First and foremost is the length of time required from the introduction of the beverage into the barrel and until the process is deemed complete and the contents emptied for bottling and sale. This time can be measured in months or, in some cases, as long as 30+ years. A typical time can be reasonably stated as two (2) to fifteen (15) years. This is a protracted amount of time for the producer to invest and carry costs until such time as it is bottled and sold; this requires a substantial amount of capital to be invested and held until a return on investment is realized.

Once a lot is bottled and sold, there is no immediate inventory replacement until the next-oldest lot comes of age and is available to be bottled and sold; any additional possible sales for the initial lot of product are missed until such time as the replacement lot is available to be sold. These are sales that are lost forever.

Also, any experimentation requires the investment of a similar amount of time as the aging process itself before the results of the experiment is known and the data becomes usable, with the attendant risk that the experiment (and the carrying costs tied up therein) is a failure and these costs and the time invested must be written off. Overall, experimentation and product expansion and differentiation is slowed considerably.

Additionally, there are natural and uncontrollable variables inherent in this aging process which can affect the final product: every barrel is comprised of a naturally-varying wood (typically oak) and is usually charred on the interior to some degree in order to effect a flavor profile. This charring process itself can vary from barrel-to-barrel and lot-to-lot. After the product is placed into the barrel and the barrel placed into storage, there are additional uncontrollable variables in the form of changes in temperature, humidity, and barometric pressure and the natural regional variations of the above which themselves vary according to more-lengthy climate cycles. All of these variables are subject to significant variation and the net result is a variance from the intended flavor profile that is not realized until the end of the usually-lengthy process. This end-product variance can be handled by blending multiple batches together in order to average out the differences. Unfortunately, this means that multiple batches must be simultaneously available in order for this product-averaging to work; again, this adds to the carrying and inventory costs.

Also well-known is the simple ongoing product loss known as the "angel's share." Evaporation of either or both of the water and ethanol through the barrel itself is typically in the range of 3% per year of storage; this product is lost and is forever unavailable to generate revenue. Each passing year of barrel storage adds to this lost revenue.

Storage of these barrels for potentially years on end requires space that is dedicated to this endeavor, which also adds to the carrying costs and logistics burdens, as the 53 gallon barrels weigh several hundred pounds each and a dedicated warehouse is typically used out of necessity; that structure must be purchased or built with continuing maintenance costs, taxes, insurance, etc. further adding to the cost burden.

Although there are different methods of barrel preparation, and different degrees to which level of preparation they have undergone, the beverage manufacturer is still presented with a fixed system by which to flavor, color, store, and mature the beverage. The barrel comes in, has liquid content added to it, and passively sits for months if not years as the aging process takes place. No changes to this passive system are usually taken. The wood cannot be altered, the char cannot be altered, the oxidation and generation of subsequent chemical species cannot be altered, at least not by very much. Movement of the barrel by rotation or by moving it from one place in storage to another to influence the aging process is about all that one can accomplish, and the influence of such changes is very slight at best. The aging system is, in essence, fixed and unchangeable, as well as being relatively slow in accomplishing its goals. The distiller is subject to this inflexible fact and to the vagaries of the inherent natural variations of this aging process which can result in finished product variation that has to be corrected post barrel-emptying. Every step adds cost, and every step that moves the beverage from one container to another invariably causes product loss due to spillage, absorption, evaporation, etc.

The basic mechanisms of barrel aging are well-known. The beverage is introduced into the charred wooden barrel, after which the beverage soaks into the wood and dissolves, extracts, and leaches various substances and chemical compounds that add flavor, aroma, color, etc. to the beverage. Some of these chemical compounds are also subject to further chemical reactions with oxygen and other compounds already present in the original beverage, producing additional compounds that add additional flavors and aromas. The carbonized portions of the char layer are also believed to absorb undesirable compounds, typically sulfur-containing compounds coming from the introduced beverage.

This is a slow process, occurring at atmospheric pressure, and ambient temperatures, in a completely passive environment. Oxidative reactions are limited to the amount of oxygen available from the headspace to start, and then from oxygen slowly permeating into the interior of the barrel through the porous nature of the wood and barrel structure itself. The processes of solvation and extraction are also more limited in efficiency due to the passive environment and the limitations that the ambient temperatures provide. Additionally, the farther away from the interior char layer and into the structure of the barrel, the wood grain has an increasingly tighter and less permeable grain structure; this also has the effect of limiting the quantities of compounds that are able to be brought out of the wood and into the beverage. The entire process is subject to atmospheric pressure changes and thermal cycling, which aids the extraction and diffusion of the wood compounds, yet the process is still basically a slow one.

The charred wood interior of the cask presents a frozen picture of a temperature gradient that existed in the moments prior to quenching, when the entire interior of the barrel was aflame for a period of time, typically one minute or less. This resulting char and temperature gradient have strong effects on the types and concentrations of soluble and insoluble solids and volatiles available to be extracted. The temperature gradient naturally goes from the highest wood temperature at the active char layer where combustion is occurring and proceeds downwards in temperature the deeper into the wood barrel structure in a direction away from the active char layer until it reaches ambient temperature.

A well-studied effect of the heating of woods that are not at the combustion temperature or actively combusting is the formation of various chemical species from the existing materials of the wood itself in the presence of heat. These chemical species vary in character and content in a fairly predictable manner according to the type of wood and the temperature at which it is exposed, and for what period of time this exposure occurs. Rather narrow bands of temperatures selectively produce certain chemical compounds that are desired for the flavoring, aging, and maturation of alcoholic beverages: lactones, vanillin, eugenol, guaiacol, and furfurals to name but a few of the more well-known. This process of heating and the creation of favorable chemical compounds is known in the industry as "toasting". The frozen temperature gradient captured in a charred barrel presents a spectrum of "toasts" (aa therefore chemical compounds) ranging from the compounds present and created at the char layer, thence to a high-temperature region where combustion was not occurring and the formation of different compounds are favored and predominate, thence to a medium-high temperature region where, once again, the formation of different compounds are favored and those chemical compounds predominate, and so on down to the unheated, untoasted new wood. Each temperature region of this char/toast profile favors the formation of different chemical compounds and those compounds predominate in those regions in comparison to the other regions.

Another aspect of this charring process that bears mentioning as it has a direct influence on the rate of extraction and diffusion is the fact that the charring process "opens up" the tighter wood grain inherent in untoasted wood. The higher the temperature "toast level", the more "open" the wood grain becomes, increasing the availability and speed at which the compounds can be accessed and extracted. This causes a preferential extraction rate starting in the higher-temperature regions of the char/toast layer, which are already in a greater level of exposure to the beverage than regions farther away from the char. This closer proximity by the higher-temperature regions to the beverage also assists in the diffusion rate of its extractives into the beverage. These two facts regarding the degree of wood grain openness and its dependency on toast level and a potential diffusion rate gradient means that the lowest-temperature regions (including untoasted wood) have, on average, a lower extractive availability and a potentially inhibited diffusion rate gradient as compared to the regions preceding it, and the same case for each of the increasing temperature toast level regions proceeding inwards towards the char layer.

This is a reason why different "char levels" available in the wood barrel as defined in the industry produce different flavoring, aging, maturation and coloring effects on the introduced beverage. Each of these temperature regions contribute distinctly different compounds that offer different flavors and chemical species that can be available over the protracted extraction, diffusion, and maturation phases, and these temperature regions are affected as to depth and thickness relative to the others depending on the char level.

The char level can be thought of as a primitively-controlled toast spectrum. One that is fixed from the moment that the barrel is quenched, which effectively fixes which compounds can be extracted, the quantity of the compounds that can be extracted, and the rate at which these compounds can be extracted and diffused thereafter. The beverage producer has very little control over the aging, flavoring, and maturation of its product after it goes into a charred wooden barrel other than to store it and wait. So, currently used aging processes are based on techniques that, while they have worked for hundreds of years, suffer from severe limitations to the beverage producer, including but not limited to the following:

Slow;

Ties up a large amount of working capital for months and years;

Ties up a large amount of storage space for months and years, increasing required capital and the various ongoing expenditures;

Limits the producer's ability to respond to increased sales demand;

Is subject to significant natural and uncontrollable environmental variations;

Loses saleable product at a fairly constant and unavoidable rate every single day for months and years;

Requires multiple handling steps, increasing product loss and chance of contamination;

Slows R&D efforts substantially, limiting flexibility and development of new products;

Limits producer to very little control over the flavor profile coming from the barrel—the barrel used and its char level set and fix the flavor profile, not the producer;

Limits producer to flavor profiles using very few woods—not all woods can be used to make barrels;

Limits producer to very little control over the wood chemical compound extraction rate—the char level and the storage environment are the controlling elements;

Limits producer to little or no control over the oxidative chemical reaction rate;

Limits the producer to little or no control over the non-oxidative chemical reaction(s) and rate(s);

Limits the producer in scalability—going from aging a two (2) liter lab batch to a 5,000 gallon tank car is realistically next to impossible; and Uses a considerable amount of a limited natural resource—specific species of wood.

The current process described herein addresses these negative issues and improves upon them and, in some cases, the improvement can be substantial and dramatic.

BRIEF SUMMARY OF THE INVENTION

In accordance with one aspect of the invention, an improved process for accelerated aging of alcoholic beverages incorporates various steps, primarily in three main areas, as follows:

1) Speed up the rate of wood and vegetable biomass compound solvation, leaching, extraction and subsequent diffusion through the beverage.

2) Speed up the rate of oxidative and non-oxidative chemical reactions in the beverage.

3) Have greater control over the entire process of producing a flavored and aged beverage, including control over the speed of extraction and diffusion, effect control over the rate of oxidative and non-oxidative reactions, and have great control over finished product flavor profiles in ways not achievable through traditional barrel aging.

To address the slow rate at which the barrel aging process occurs and to accelerate it substantially, the following concepts (also referred to herein as "steps") are used, in various combinations:

A) Increase the available surface area per unit mass of wood or other biomass to increase the rate of chemical compound solvation and extraction as compared against a unit volume of the beverage.

This modification involves the size reduction of a given wood or vegetable biomass product. Generally, the smaller the nominal particle size, the greater rate of wetting and extraction.

B) Decrease the maximum thickness of any resultant size-reduced particle to be used in order to allow the shortest distance to the center of that particle to speed wetting and extraction.

This means to try and reduce the aspect ratio (length vs width vs height) towards an ideal of a sphere (1:1:1 x:y:z axis).

C) Agitate an immobilized bed of wood/biomass (the "bed mass") in order to achieve fresh surface renewal.

This step can be performed continuously or intermittently. Fresh surface renewal assists in the extraction/diffusion process. It can be performed by any means available, acting directly or indirectly.

D) Perform sonication of a wood/biomass bed.

This step can assist in the extraction process by breaking down cell walls and other structures and allowing a greater degree of and faster extraction rate of the chemical compounds.

E) Change the passive pool of beverage into a continuous stream that flows over and through an immobilized bed of wood/biomass.

The goal here is to pass the beverage over an immobilized wood/biomass bed, creating a higher solvation, extraction, leaching, and diffusion rate versus a passive pool.

F) Make every effort to have the beverage flow through the bed mass as evenly as possible.

The goal is to have all of the bed particles subjected to the same beverage exposure time, and container shape, bed mass, and inlet/outlet design can be significant factors.

G) If the system is one that recirculates the beverage, have the beverage flow rate through the bed mass to be as high as is reasonable and practical in order to speed up the extraction and diffusion process.

If the system is a recirculating one, aim for a "batch turnover" rate of at least one (1) batch size volume per minute, preferentially >four (4) batch volumes per minute.

H) Heat the beverage.

The processes of solvation and extraction and diffusion is thereby enhanced at ambient temperatures, but considerably greater gains in speed occur by heating the beverage. Heating the beverage also increases the rate of oxidative and non-oxidative chemical reactions, further accelerating the aging process.

I) Provide oxygen to the beverage in process, preferably in a controlled manner.

In order for the oxidation reactions to occur, oxygen must be provided. Too much oxygen could lead to detrimental results, so control over the amount, rate, and timing is desired.

J) Use ultrasonics to enhance chemical reaction rates.

Ultrasonics can be used to impart greater homogeneity in the beverage, as well as additional energy for chemical reactions, as well as the creation of desirable chemical species.

K) Provide the ability to add additional gases, liquids, or solids into the process.

There are many possible reasons why additional substances may be desired for addition into an active process, not restricted to: flavoring, coloring, oxidation, catalysis, additional reactants, suppression of oxidative and non-oxidative reactions, to name but a few.

L) Provide for the ability to "polish" the beverage.

Typically, one could use charcoals or activated carbon or other molecular sieves, but any substance or method can be introduced to sequester or neutralize unwanted chemical compounds.

M) Condense and return vented gases back to the process to lower or eliminate any loss of product.

These gases and vapors may contain alcohols, water, and desirable flavor/aroma compounds; condense them out of any gaseous exit stream and return them to the process.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Process: Acceleration

| | |
|---|---|
| 10 | Primary Holding Vessel |
| 12 | Pump |
| 14 | Bed Mass Containment Areas |
| 16 | Biomass bed |
| 18 | Secondary Holding Vessel |
| 20 | Conduit |
| 22 | Mechanical Agitator |
| 24 | Ultrasonic Chambers/transducers |
| 26 | Additional Holding Vessels |
| 28 | Hot plate/Burner (Heat Source) |
| 30 | Oxygen/Gas Supply |
| 32 | Vapor Condenser |
| 34 | Flow Indicator/Sensor |
| 36 | Control Valves |
| 38 | Entry Points |
| 40 | Chemical/Spectroscopic Sensors |
| 42 | Electromagnetic Energy |
| 44 | Liquid Supply |

Figure 1:
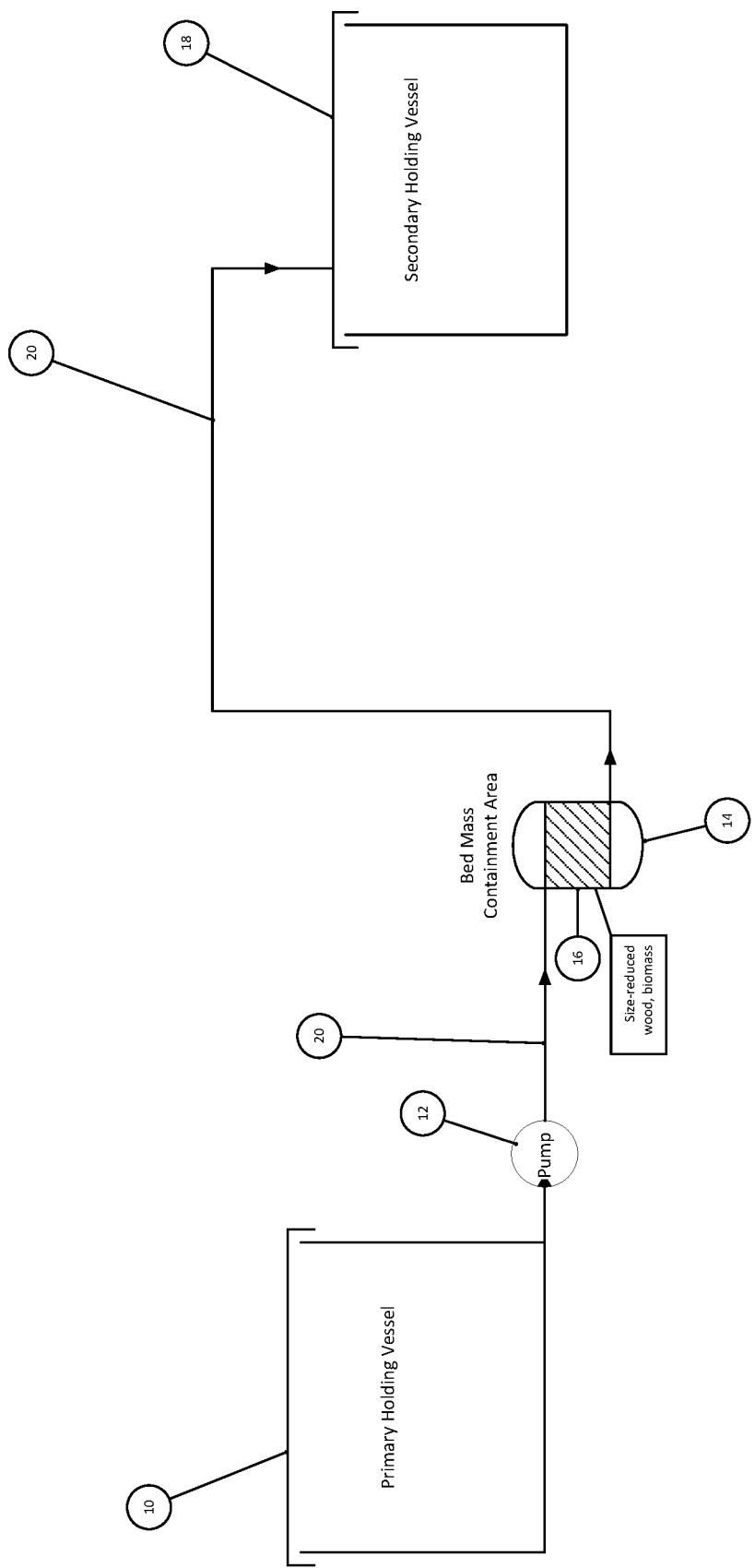
FIG. 1 is a schematic view of one embodiment of a process for accelerating the aging of alcoholic beverages, wherein an alcoholic beverage is pumped from a primary holding vessel through a bed mass containment area containing size-reduced wood or biomass, and is then pumped into a secondary holding vessel.
Figure 2:
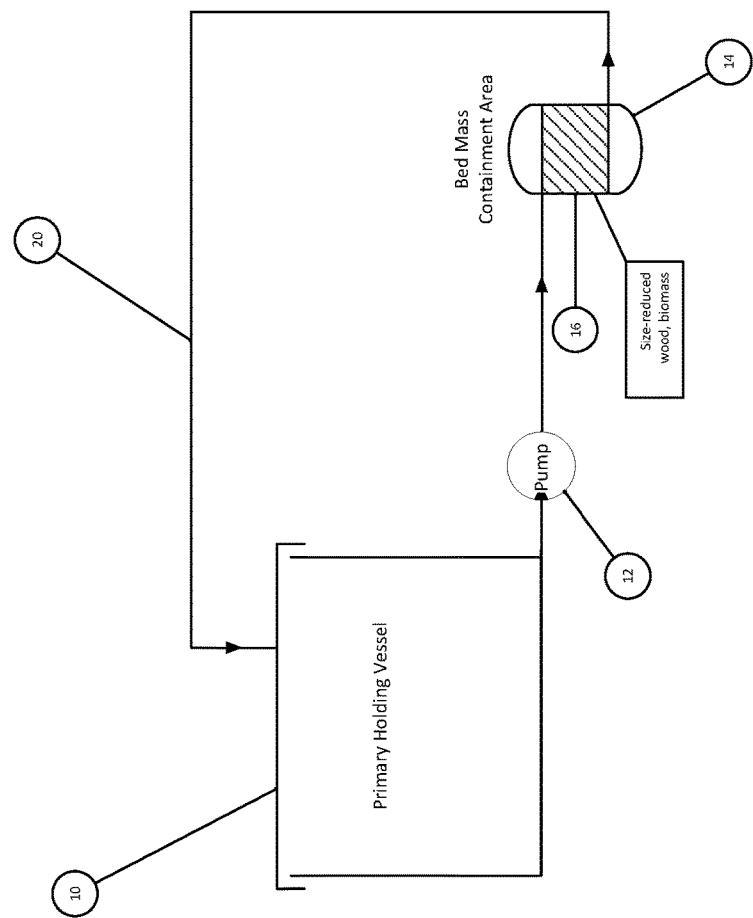
FIG. 2 is a schematic view of another embodiment of a process for accelerating the aging of alcoholic beverages, wherein an alcoholic beverage is pumped from a primary holding vessel through a bed mass containment area containing size-reduced wood or biomass, and is then pumped back into the primary holding vessel.

Referencing the above concepts of improvement that are related to accelerating the rates given in 1) and 2) above, the process can use any or all aspects as briefly given in any combination desired, with the only absolute requirements being items A) and E). That being said, significant improvements in speed and control are achieved using the other steps and modifications described above and it would be preferable to incorporate as many of these as possible in as many ways as possible in order to realize the greatest benefit as to accelerated aging and control over the final beverage. In its simplest form the process would be as shown in FIG. 1:

FIGS. 1 and 2 illustrate a primary holding vessel 10 containing the initial alcohol beverage, a pump 12 to draw the beverage from the primary holding vessel 10 and force the beverage under pressure through conduit 20 into and through a bed mass containment area 14 containing an immobilized bed of size-reduced wood and/or vegetable biomass 16, and the resultant beverage collected in the primary holding vessel (as shown in FIG. 2), or a secondary holding vessel 18 (as shown in FIG. 1) depending on the chosen process needs. There need not be any headspace in the system, nor must the process occur strictly at atmospheric pressure; the system may be closed and sealed and may or array not be purged of air and can proceed at pressures exceeding atmospheric if desired. Any purged air could be replaced with another gaseous product for reasons not limited to accelerated oxidation, provision of additional flavors, addition of catalysts or other chemical reaction-rate enhancers, inert gas blanket, etc. These variables regarding a sealed/open system, air purging, gaseous replacement, process pressures and the like also apply to all subsequent system descriptions. Beverage recirculation does not have to occur, as a bed mass that is high enough relative to the beverage volume and that has been size-reduced enough can solvate and extract enough from the bed to provide the basis for additional subsequent aging through oxidative and non-oxidative methods, enhanced or not. An example could be given whereby the pumped beverage is collected and subjected to treatments which cause or assist in the oxidative and non-oxidative chemical reactions in the chemical aging step, and such reactions could be further assisted by the use of additional methods of energy input if so desired such as, but not all-inclusively, heat, ultrasonic agitation/cavitation, mechanical cavitation, exposure to the electromagnetic spectrum in part or in whole with emphasis to visible light and shorter wavelengths. Such post-extraction procedures can apply to all subsequent process system descriptions.

If a smaller bed mass is used and the resultant beverage has not yet extracted enough from the bed mass after the first pass, then a recirculating system can be used and the beverage recirculated as many times as required or that the bed mass will support before depletion, FIG. 2.

As previously described above, the beverage is taken from a primary holding vessel 10 and forced tinder pressure through a bed mass containment area 14 containing an immobilized bed mass 16 and then returned to the primary holding vessel 10 for recirculation. An advantage to this system version is the ability to use a smaller bed mass, and the ability of the system to deplete the chemical compounds contained in the bed mass to a much greater degree. This maximizes the efficiency of the crucial flavor- and chemical-compound containing wood/biomass; the leftover non-extractives primarily consist of those willingly left there by the producer. This method allows much greater utilization of what these vegetative biomasses have available, and greatly reduces the amount of vegetative biomass required as compared to traditional barrel-aging. In the case of a typical American White Oak barrel-aged product, the increase in "wood efficiency" is in the area of five (5) to thirty (30) times, meaning that one can use one-fifth to one-thirtieth of the mass of wood to produce the same volume of aged and finished beverage. This biomass reduction is a large savings of material mass, plus it is environmentally-friendly as it strongly conserves a limited natural resource.

This recirculating system version can accelerate the process further by the application of the mechanisms and concepts as given in B)-D), and F)-M) outlined above. Significant gains in the acceleration of the aging and maturation process can be achieved by using as many of these options as one can, and in as many ways and combinations as one can. A first version is shown in FIG. 3.

Following A)-D) above, the immobilized bed mass has been size-reduced such that its longest nominal particle dimension is approximately 10 mm, with a largest nominal thickness not exceeding 5 mm; dimensions smaller than these further increase the rate of wetting, solvation, and extraction. Although larger bed mass particulate may be used, dimensions greater than these tend to decrease the rates of wetting, solvation, and extraction, slowing the process down. This bed mass can be subjected to agitation (vibratory and reverse-pitch auger shown) in order to expose and re-expose fresh surfaces to the beverage flow, and can also be sonicated with ultrasonic energy to help break down the biomass structures and allow for faster and greater extractions.

Figure 3:
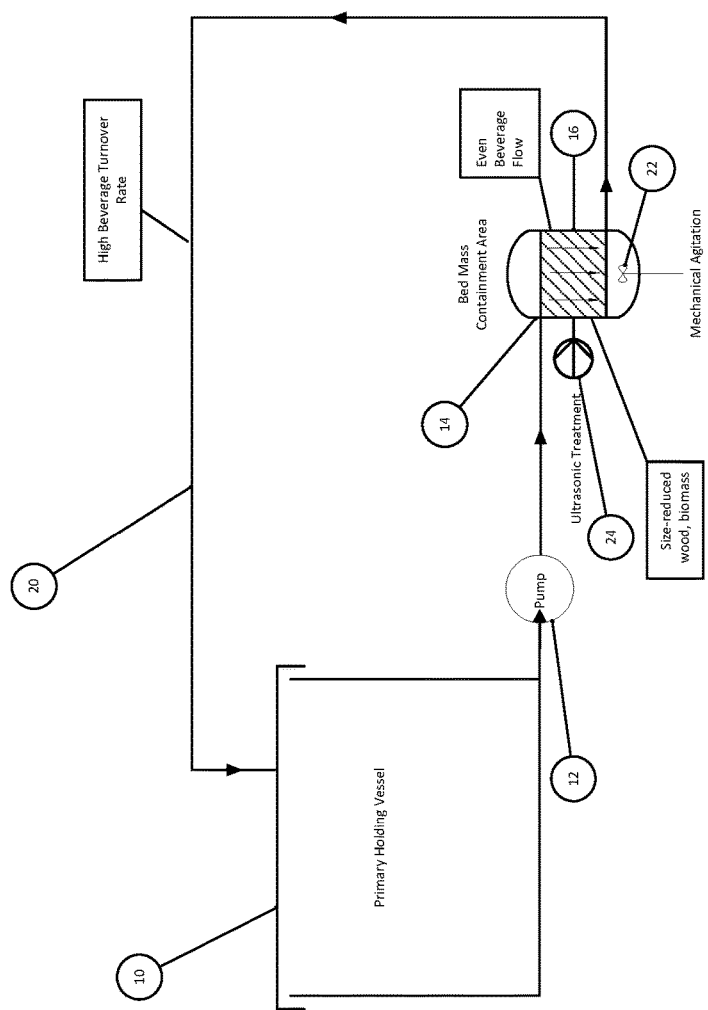
FIG. 3 is a schematic view of another embodiment of a process for accelerating the aging of alcoholic beverages as shown in FIG. 2, and further including steps for ultrasonic treatment and mechanical agitation within the bed mass containment area, as well as provisions for even beverage flow therethrough.
Figure 7:
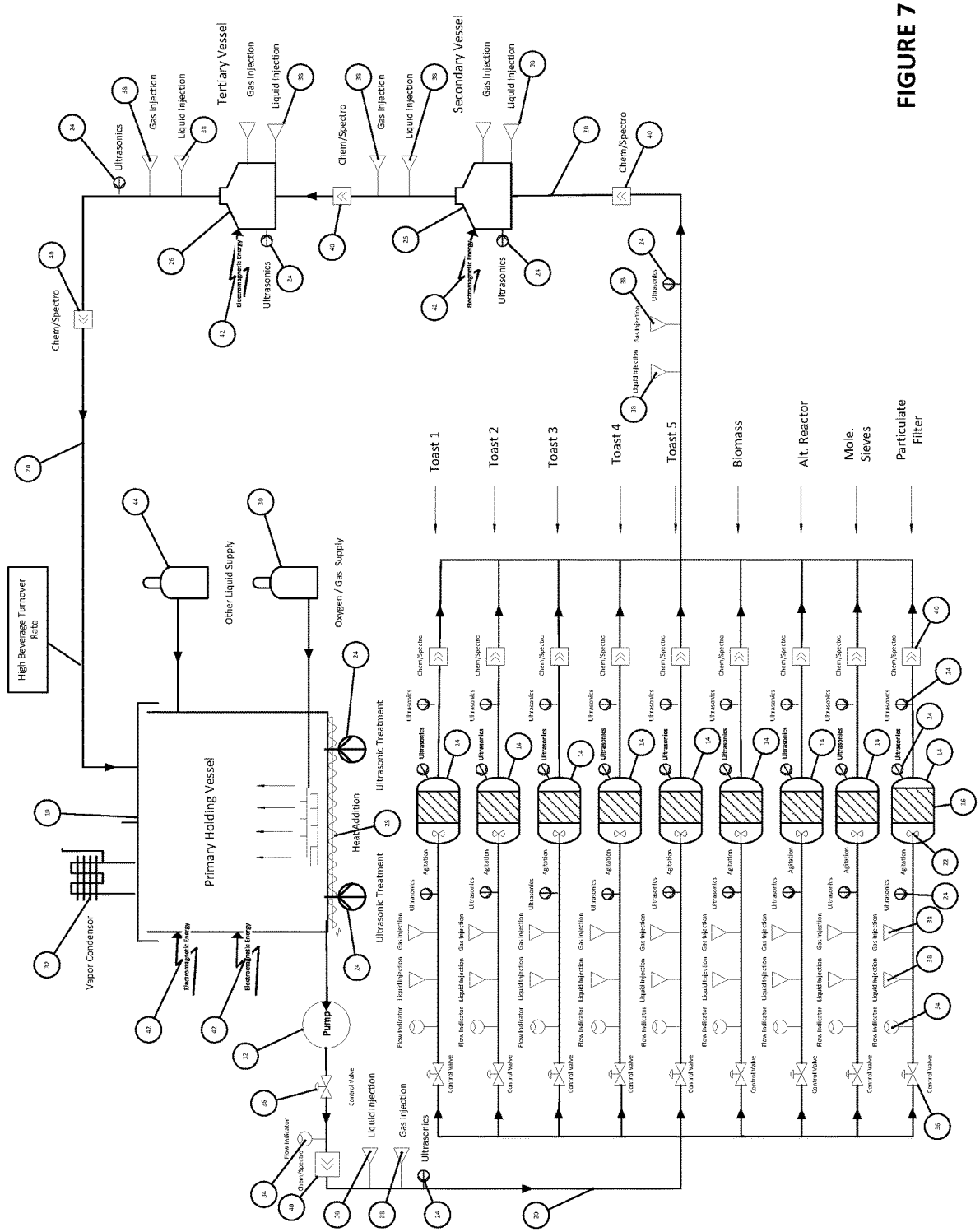
FIG. 7 is a schematic view of one embodiment of the process for accelerating the aging of alcoholic beverages, including a primary holding vessel, conduits for pumping the beverage through nine bed mass containment areas in parallel, each bed mass containment area having a specific function, and further including a secondary and tertiary vessel in series, along with various points along the conduits for providing liquid and gas injection, ultrasonics, chemical/spectroscopic sensors, and the addition of electromagnetic energy within the primary holding vessel.

As shown in FIG. 3, the beverage is removed from the primary holding vessel 10 and, via a pump 12, forced under pressure into the bed mass confinement area 14 and through the bed mass 16 until discharge out of the confinement area and back into the primary holding vessel 10; multiple additional holding vessels 26 can be used, as desired (as shown in FIG. 7), in order to carry out segregated yet simultaneous aging operations. The beverage is then preferably returned to the primary holding vessel 10 in order to be taken up once again by the pump 12 and the cycle repeated.

As per steps E)-G), the bed mass containment area 14 is preferably designed in such a way as to promote even beverage flow across the axes normal to flow, as this arrangement exposes the bed mass 16 more evenly and result in shorter overall processing times, as well as greater utilization of the bed mass itself. This process includes methods such as distribution manifolds, multiple entry points 38, multiple entry points 38 of varying cross-section, etc.

The flow rate of the beverage is preferably made as high as is reasonable and practical since, on a per unit volume of beverage being processed, a higher flow rate results in a higher rate of solvation, extraction, and diffusion and greatly accelerates aging process. A targeted flow rate is preferably in the range of 1×-10×/minute of the system beverage volume, i.e., if the total system volume were 1 liter, then a flow rate of 1-10 liters/minute is the preferred target. It should be understood that lower or higher rates can be used, as desired. Lower flow rates tend to result in a longer extraction time, while higher flow rates result in a shorter extraction time. Depending on the producer's finished product goals, a lower flow rate may be selected to lengthen the processing time; by way of example, this may allow the producer the option of additional aging techniques and procedures that might take more time than the extraction portion of the process. Another reason for selecting a lower flow rate could be to limit back-pressure development from the bed mass. In any case, lower flow rates can be chosen. Higher flow rates will speed the extraction process, but may hinder the adequate completion of other aging reactions. This may be acceptable, as the beverage may be at a stage of adequate completion or, if not, then the producer may choose to post-process the beverage with additional aging steps, typically as regards the oxidations and other chemical reactions. Also, higher flow rates build system pressure much faster as the bed mass resists flow, and the pumping capability are taken into account, as well as any heating or otherwise undesirable effects from such pressure generation.

Figure 4:
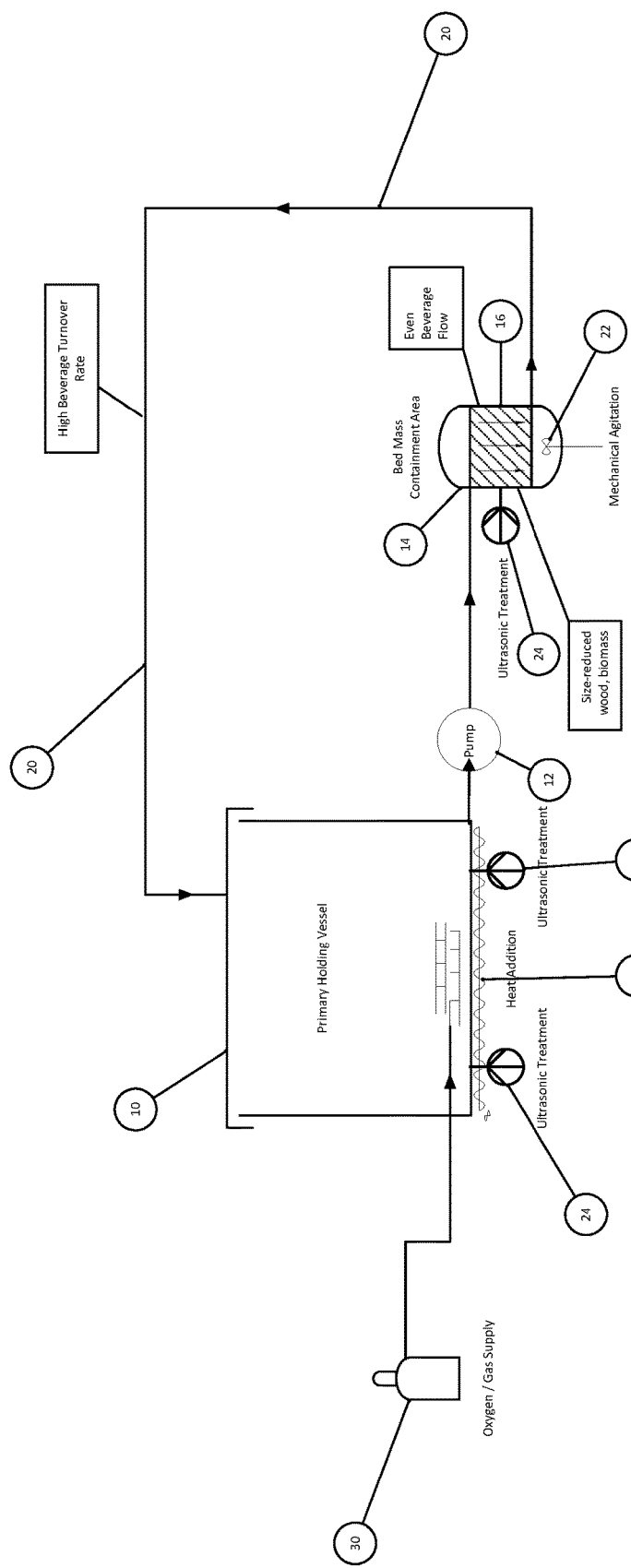
FIG. 4 is a schematic view of another embodiment of a process for accelerating the aging of alcoholic beverages, wherein an alcoholic beverage is subjected to heat, ultrasonic treatment, and the addition of gas, such as oxygen, within the primary holding vessel, and is then pumped into a bed mass containment area for further ultrasonic treatment, mechanical agitation, and exposure to sized reduced wood or biomass, and is then pumped back into the primary holding vessel.

Steps H), I), and J) can be seen in FIG. 4 as an example layout and are not limited in placement and methodology to those shown.

The beverage cars be heated in any manner convenient to the producer; shown is the primary holding vessel being heated via a hot plate/burner arrangement 28 as a simple example. Heating the beverage greatly facilitates the process of extraction from the bed mass and the diffusion of the extractives throughout the beverage, and increases the rate of the subsequent chemical reactions. The process works at practically any temperature, but a preferred range is at a temperature above that of ambient. The higher the temperature, the faster the rates of solvation and extraction and the subsequent chemical reactions; upper limits to the temperature naturally occur depending on the process set-up or the beverage being processed. For example, at atmospheric pressure an upper limit could be set by the boiling temperature of ethanol or other alcohols; this limitation may be countered by making the system process capable of being pressurized, thereby raising the boiling temperature. Or, the parent beverage being processed may have certain required chemical compounds already present that degrade at a given temperature, limiting the process temperature to some level below that point. In reasonably normal practice at atmospheric pressure and open to atmosphere, then a temperature as high as possible, yet under the boiling point of the ethanol and other valued components would be indicated. In practice this process has been very effective in the range of 149 F-173 F. Temperatures below this can be used, but array cause the aging process to take place over greater amount of time while also potentially limiting the total amount of compounds so extracted.

Introduction of oxygen into the process from an oxygen/gas supply 30 can assist in the oxidative reactions if one so desires, in addition to any headspace present. This step can be done in a variety of ways, and at a variety of locations. Non-limiting examples include atmospheric gases, pure oxygen, oxygen/other gas combinations; and with entry points 38 at any point in the process, or at multiple points in the process. For example, there may be a gas injection port located after the bed mass containment area only, or, one at that location plus a sparging arrangement located in the primary (or secondary, etc.) vessels. The producer can control the amount, rate, and timing of the oxygen introduction as needs require to control the oxidative products. This arrangement can limit the oxidations and other subsequent reactions that are dependent of the prior oxidative reactions if desired; conversely, the producer can extend the chemical reaction processes by increasing the rate, concentration, and overall time of the oxygen addition.

Ultrasonic energy from ultrasonic chambers 24 can further assist in the blending, homogenization, dispersion, and overall chemical reaction types and rates. There are many options and choices the processor can make regarding the types, frequencies, amplitudes, input energy, and locations for these sorts of processes. Typically, the frequencies range from 20 kHz up to 1 MHz with energy dissipations from a few watts through several thousand watts, although these are not all-inclusive and other specifications and frequencies may be selected. Similarly to the various entry points 38 for the introduction of oxygen, one or more locations can be chosen for the application of ultrasonic excitation, and each location could have different frequencies, amplitudes, and energy inputs depending on the equipment configuration/geometries, as well as the intended reason for the application of ultrasonic energy at that point. Extra ultrasonic chambers 24 could be designed into the system just for this reason, and ultrasonics could be used in the primary, secondary, etc. holding vessels, each having the same or different ultrasonic design criteria applied.

Figure 5:
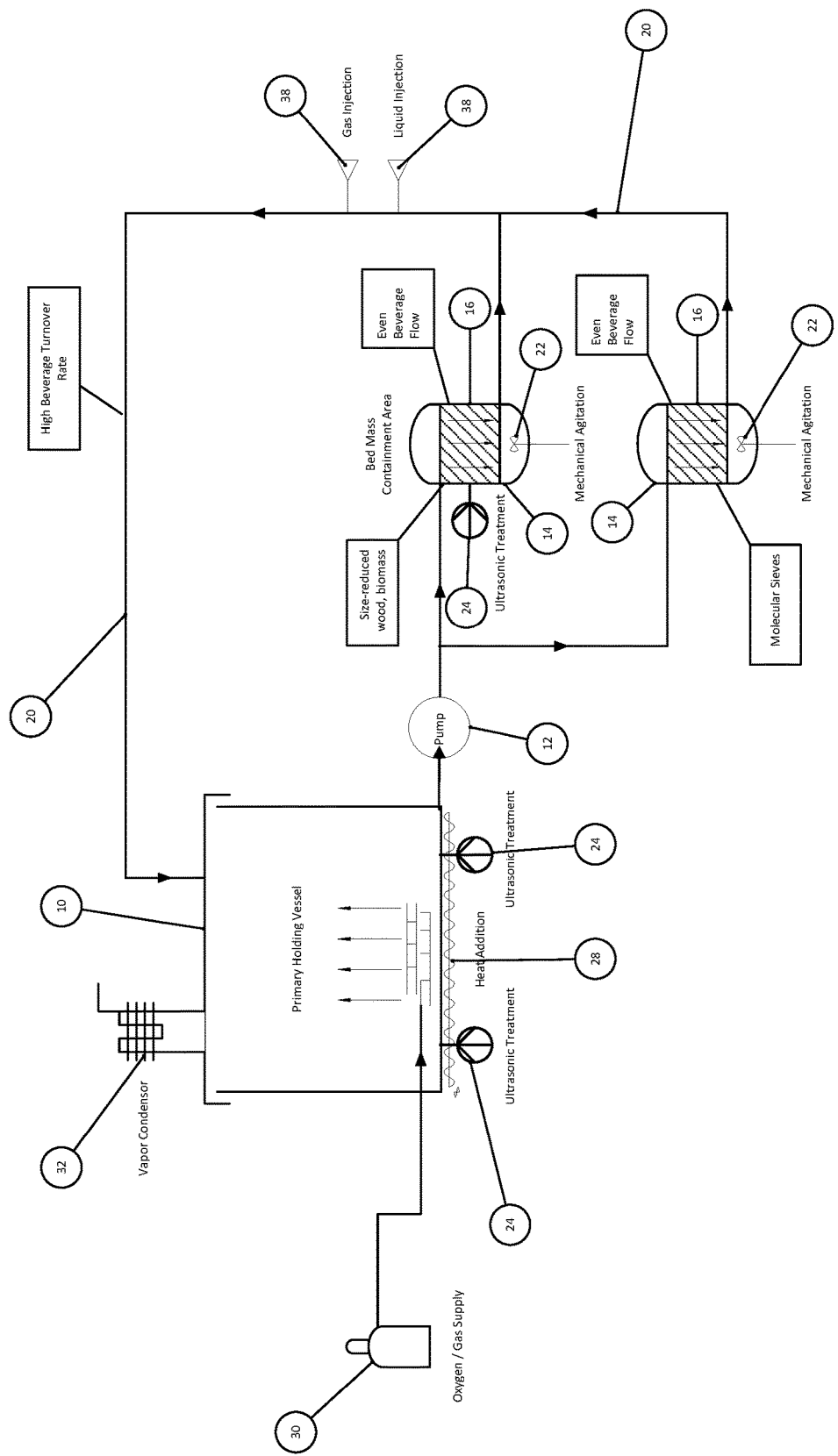
FIG. 5 is a schematic view of another embodiment of a process for accelerating the aging of alcoholic beverages, wherein an alcoholic beverage is subjected to heat, ultrasonic treatment, and the addition of gas, such as oxygen, within the primary holding vessel, wherein the primary holding vessel includes a vapor condenser, and the beverage is then pumped into a pair of bed mass containment areas, arranged in parallel, wherein the first bed mass containment area provides further ultrasonic treatment, mechanical agitation and exposure to sized reduced wood or biomass, and wherein the second bed mass containment area provides exposure to molecular sieves and mechanical agitation, and wherein the beverage is then pumped through conduits including gas injection and liquid injection points, and then back into the primary holding vessel.

FIG. 5 shows additions to the system by integrating items K), L), and M) as listed above.

Provisions are preferably made for the introduction of other gases/vapors, liquids, and solids through entry points 38. There are many possible reasons for such introduction, including but not limited to: flavoring, added oxidation, suppressed oxidation, chemical reaction catalysis and/or enhancement, coloring, bleaching, blending, etc. For example, it may be desirable to have a nitrogen blanket purge at the beginning of the process, to be followed by the addition of oxygen at some point, and provisions may be made for such steps. In another embodiment, a liquid oxidant may be desired at some point in the process and may be introduced. Other embodiments of the process may include the blending-in of a less-than desirable prior product run, or the blending in of an entirely different beverage product in order to marry the two flavors. Additionally, some embodiments may include the introduction of a solid into the flow stream for solvation or ablation, etc., for coloring reasons, enhanced chemical reaction rates, or flavoring reasons to name but a few.

The ability to introduce a solid into the flow stream also includes the ability to add a material such as activated carbon, charcoal, or other molecular sieves or reactants for the removal of undesirable compounds. Anything that removes, sequesters, or otherwise neutralizes unwanted compounds from the beverage can be used regardless of mechanism of action. The flow to such a treatment area and the timing thereof are at the producer's discretion.

The process system preferably includes the ability to capture any exiting or fugitive vapors, in order to condense them for reintroduction to the parent beverage, whether continuously or at some other time via closed capture vessels. This mechanism for capturing fugitive vapors becomes much more important if the process uses gas/liquid/solid additions to the process at any point, as any material introduction tends to displace system volume and system venting may be required. Continuous gaseous injection may necessitate a venting procedure and an gas or vapor discharge carries water vapor, alcohols, etc. with it; these vapors are preferably condensed and reintroduced back to the process or final beverage at the producer's discretion.

Process: Control

Although steps A)-M) are listed and discussed referencing the original areas of improvement 1) and 2), they also inherently contribute to and are a part of the overall effort to exert and maintain greater producer control over the beverage aging process. However, the process system is also capable of exerting profound and unprecedented levels of control over the final beverage flavor profile that extend well beyond those areas of control already given. These methods of flavor profile control are given pursuant to the area of improvement described in 3) above.

In the background discussion on the effect of the barrel charring process and the creation of a spectrum of toasts, and therefore different levels of different chemical compounds available for solvation and extraction and diffusion into the beverage, it was also noted that the barrel charring process effectively "freezes" that spectrum at the time of quenching and a return to ambient temperature. As noted, these traditional processes effectively limit the flavor profile available and possible for that wood and char level, and place definite limits on the amount of control the producer may have on the final beverage flavor profile.

By use of the novel aging process described herein, those producer limitations are reduced to a large degree and a novel amount of control is introduced.

Revisiting FIG. 3, the bed mass containment area is stated to contain a size-reduced wood or biomass product, and has not been extrapolated to include more than one product; however, multiple biomass products may be used.

Referring back to the char level and wood-toasting effect of the elevated temperature profile of the charred and quenched wood substrate, one can break the spectrum of toasts down into ranges. For simplicity's sake, one could define these ranges according to the approximate temperature exposure during the charring process: Low (200-280 F), Low-Medium (280-340 F), Medium (340-420 F), Medium-High (420-500 F), and High (500 F+) with each of these ranges having a greater preponderance of certain chemical compounds favorable to the development of flavor than the others. This is a well-known mechanism with well-known characteristic compounds and flavors in each temperature range, generally proceeding from lactones to vanillin to eugenols to guaiacols to furfurals in reference to the increasing temperature scale given above. Phenols, another very important group of chemical compounds, are also present, especially in the higher-temperature ranges.

Whereas this spectrum is fixed and controlled by the charring process, it can be advantageous to take the original wood product that makes up the barrel (untoasted wood) and heat it in a controlled and non-destructive manner to a certain temperature and then to hold it at that temperature for a certain time that is long enough for the wood to become isothermal and for the temperature-dependent chemical reactions and other changes to take place. Different levels of temperature exposures can be performed on separate lots of wood products thereby creating a spectrum or palette of available wood toasts, each heated and held to a particular temperature for a prescribed amount of time; each toast temperature would have its own chemical compound and flavor characteristic. These toasts may then be size-reduced (if they hadn't been prior to toasting) and made available for flavor profiling of the beverage product. This step frees the producer from the frozen toast spectrum of a charred wooden barrel and allows them to select not only the toast flavors that they desire, but to also mix and match them at whatever proportions they desire to create flavor profiles that are not available via traditional barrel-aging. By way of example, because the untoasted wood and lightly-toasted woods are the ones farthest from the beverage in the barrel, and are the ones that present the tightest grain structures that further limit solvation and extraction of their particular compounds, a producer may increase the proportion of that size-reduced bed mass relative to the others in order to create a novel flavor profile. Alternatively, the producer could simply eliminate other toasts that would normally be present and, again, have a novel flavor profile not available in a traditional charred wooden barrel. Perhaps the producer would want a flavor profile that was smokier than what was available via barrel aging; in that case they could increase proportion of the more-charred toast relative to the other toasts selected. The examples given above are just a few of the myriad possibilities available.

All of the size educed toasts (as chosen by the producer) and their respective proportions (as chosen by the producer) may all be contained in the bed mass containment area—not just one single size-reduced toast. This arrangement allows a previously-unavailable level of control by the producer over the final beverage flavor profile versus traditional barrel aging.

Additional levels of control can be exerted by the selection and use of larger or smaller particle sizes, as the smaller particle sizes are subject to faster wetting, solvation, and extraction than larger particles sizes. This particulate-size selection can be used as a method to speed or delay a given toast's extraction rate, as well as the subsequent oxidative and non-oxidative reactions that may depend on that toast's extractives.

Figure 6:
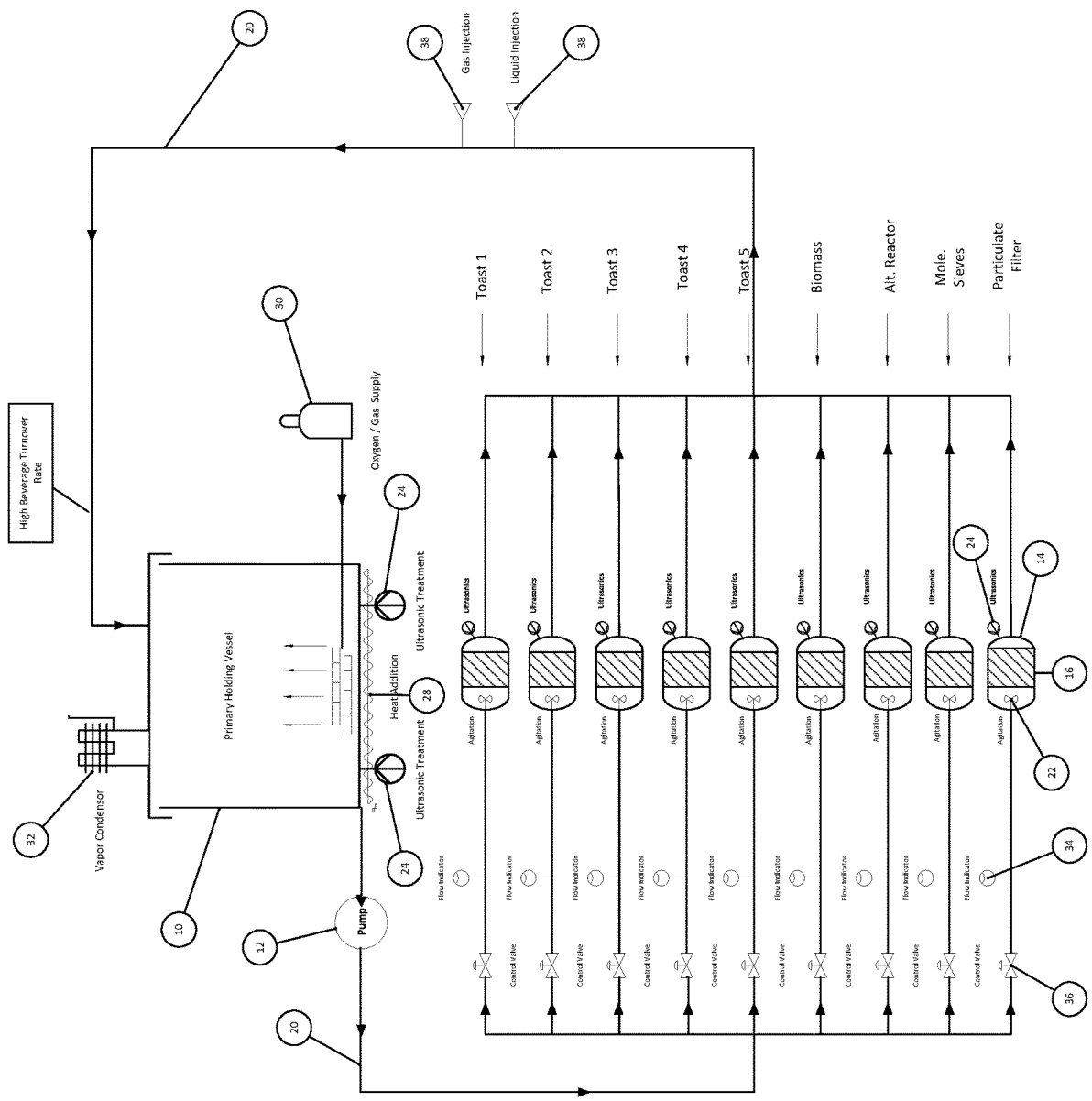
FIG. 6 is a schematic view of the embodiment of the process for accelerating the aging of alcoholic beverages as shown in FIG. 5, but wherein the beverage is pumped through nine bed mass containment areas, wherein each conduit leading to a bed mass containment area includes a valve, followed by a flow indicator, and wherein each bed mass containment area includes provisions for agitation and ultrasonics; and wherein each bed mass containment area may include different woods, biomass, particulate filters, molecular sieves, and alt. reactors in a desired combination.

To expand upon this concept further, and to increase the producer's control and expand the capacity of the system, consider FIG. 6.

Instead of a single bed mass containment area as shown in FIGS. 3, 4, and 5, a flow distribution manifold arrangement is used to simultaneously provide multiple bed mass containment areas with beverage flow. Each containment area could have one or more of the specific wood toasts, and in differing proportions; this arrangement allows even greater control over the final flavor profile, especially if the flow to each containment area is controlled and monitored. By way of example and following the toast temperature scheme as laid out previously, a producer may provide five (5) bed mass containment areas 14, each filled with varying masses of each of the toasts from Low Temperature through High Temperature as decided upon by the producer, and full beverage flow established through each; this process allows the producer to pre-select and control the final flavor profile with unprecedented control by the alteration of the wood toast mass ratios as compared to traditional barrel aging. Alternatively, as a variation to the above, all bed mass containment areas 14 may be filled with the same mass 16 of the differing wood toasts and individual control valving and flow rate monitoring used to allow for full or restricted beverage flow rates through each of the containment areas as determined and controlled by the producer. Again, this procedure alters the proportions of the extractives, the extraction rates and quantities, and therefore any subsequent reactions, all of these factors being under the control of the producer.

There is no strict upper limit to the numbers and sizes of these bed mass containment areas, as those factors may be selected by the producer according to their requirements.

Conversely, for example, a producer may have many bed mass containment areas to accommodate a wide range of beverage products and simply turn off beverage flow to any of these areas at will via control valves 36 and as the beverage products flavor profiles dictate.

Another method by which the producer can alter the flavor profiles in ways not well-exploited in the traditional barrel aging method is by use of alternative woods in the bed mass containment areas, these alternative woods also having varying toast or charring levels; novel flavor profiles could thus be created. These alternate woods and/or toasts may also be size-reduced to enhance their extraction rates. Other chemical compounds not present in the traditional American White Oak or French Oak may be extracted and these compounds may oxidize or otherwise undergo reactions to produce different end compounds and therefore different flavors and aromas. Other wood products may include such items as used wooden barrels that have been size-reduced, ones that previously contained wines or brandies or rums, etc., lending a unique flavor as well as being environmentally sound in the full re-use of a potentially discarded item.

These multiple bed mass containment areas 14 do not need to strictly contain toasted wood products and this feature may be another way of exerting control over the final flavor profile. These multiple bed mass containment areas 14 may also be used to contain other flavoring elements, for example but not limited to peat (smoked or unsmoked), coffee beans, vanilla beans, cinnamon sticks, roasted peanuts, cloves, fruits, juniper berries, cocoa, etc. Any solid that the producer desired to be used for the addition of alternate flavors or compounds could be used, and its mass and beverage flow rate controlled such to bring about the desired level of addition. As with the alternate woods, extractives may include chemical compounds that have undergone subsequent chemical reactions to produce additional novel flavors or aromas.

As covered earlier, one or more of these multiple bed mass containment areas may be used for the removal of unwanted flavor or aroma compounds via activated carbon or charcoal or other molecular sieves or neutralizing agents; these examples are not an all-inclusive list. The masses 16 of one or more of these bed mass containment areas 14 and the beverage flow rate may be defined and controlled by the producer to maximize its beneficial effect.

One or more of these multiple bed mass containment areas 14 may be used to extract the very last compounds from previously used size-reduced wood and other biomasses; this step permits a much fuller use of these biomasses, especially in comparison to the traditional barrel aging method. All woods or biomass materials 16 that had been used in prior production runs may be collected and re-processed through the system until no more is to be economically extracted, making this process an environmentally attractive option with inclusive economic benefits.

One or more of these multiple bed mass containment areas may also be filled with previously used wood and biomass products that had been previously used to process other beverages, alcoholic or otherwise; this step brings additional flavoring undertones and aromas to expand upon the primary beverage being processed.

One or more of the multiple bed mass containment areas 14 may be used for online particle filtration, constantly filtering out entrained particles of matter such that post-process filtering operations are reduced in time and materials, or eliminated altogether.

These spent wood and other biomass products may then be subjected to ethanol recovery processes using, for instance, a vapor condenser 32, and the recovered materials re-used, including by liquid or gas injection into an active beverage production run using this process. The remaining spent and de-gassed solids may then be recycled with potentially more options as no volatiles would remain.

Integrating the above-described multiple bed mass containment system which represents a more-complete extension of the concepts listed in steps A)-G) with the remaining steps H)-M) results in a process system potential as shown in FIG. 7. Such a system isn't a requirement, nor is it representative of all that can be done, but it does show an example of a more-developed system potential. Many of the described elements are in use in this suggested diagram, and some are in use at multiple locations to enhance the overall aging of the beverage in as many ways as possible. For the sake of clarity, not all control mechanisms (valving, flow sensors, drain & test valves, pumps, pressure sensors, chemical/spectroscopic or other sensors, couplings, etc.) that can be possible are shown and the locations that are shown for the various components can be changed at will by the producer at will.

Starting at the primary holding vessel 10, heat is being introduced into the beverage. The heated beverage is then drawn into a pump 12 that then discharges the beverage under pressure through the conduit 20 towards the flow distribution manifold that feeds the beverage to the multiple bed mass containment areas 14. Prior to arriving at the manifold, the beverage can by exposed to ultrasonic energy in the form of one or more transducers 24, with wavelengths and energies chosen to promote homogenization/emulsification or wavelengths and/or energies chosen to promote chemical reactions, for example. A flow control valve 36 and a pressure readout are shown, as well as a flow rate indicator 34.

The beverage then arrives at the flow distribution manifold Thereby the flow proceeds to those bed mass containment areas 14 that are open to flow. Each bed mass containment area 14 is shown as hawing its own flow control valve 36, pressure sensor, and flow rate readout. Prior to entering a bed mass containment area 14, the beverage can have gases or liquids introduced into the flow stream and may also be subjected to ultrasonic treatment if desired. The drawing shows a parallel-flow manifold arrangement, but this can be arranged in any a flow combination desired: parallel-parallel, parallel-series series-parallel, series-series. Alternate flow paths to additional bed mass containment areas that are in parallel to a bed mass containment area 14 could be provided in order to facilitate, for example, the anticipated depletion of a given bed mass with a fresh, new bed mass 16 by being brought into that circuit's flow path through a bypass valve; another example being the packing of a particulate filter where the full filter is bypassed and a new, paralleled filter containment area being valved into the active process.

The beverage then flows into one or more bed mass containment areas 14; each containment area 14 can contain any solid item desired at whatever mass chosen. A possible example would be for one or more containment areas 14 to contain size-reduced wood toast(s), in single or mixed toast proportions and types of wood; or other vegetative biomass items, such as peat or another flavoring item, e.g., vanilla bean, etc. as described prior; or a compound filtering mass such as activated charcoal for the removal of unwanted flavors or aromas; or a physical filtering media to filter out unwanted particles. Any and all combinations can be exercised as deemed fit by the producer. One or more of the bed mass containment areas 14 may be subjected to agitation or ultrasonic treatments, or an entirely different vessel substituted for these and other reasons as desired.

After the beverage leaves the bed mass containment area 14, gases or liquids may be introduced and the resultant mixture exposed to another ultrasonic treatment area. A typical valving and pressure/flow rate readout arrangement is shown. Another version could be where gases and/or liquids may be introduced into the flow stream after the ultrasonic treatment area, and then be ultrasonically treated again or not. Prior to rejoining any other flow streams exiting other bed mass containment areas, a continuous chemical/spectroscopic monitoring device 40 may be used to aid the producer in continuously analyzing the flow stream exiting each bed mass containment areas for desired characteristics and effecting changes as needed, it is contemplated that this sensor can be placed anywhere in the process system, and this arrangement represents a more specific example of such use.

After the flow streams have been recombined into one, any or all of the above actions may be performed on the entire recombined flow stream: gaseous or liquid introduction, ultrasonic energy exposure, chemical analysis as examples.

The recombined flow stream is then directed into a secondary holding vessel 18 for further operations if desired. Additional holding vessels 26 can be added in series or parallel as desired, the drawing showing a series arrangement. These other holding vessels 26 may be used as areas for continued aging and processing operations such as (but not restricted to) gaseous or liquid introduction, ultrasonic energy exposure, irradiation with an electromagnetic spectrum. Each vessel is shown with gas venting and vapor condensation/return capabilities although the inclusion of these features is purely at the discretion of the producer.

Every vessel discharge may also include a chemical/spectroscopic monitoring device 40 inserted as desired for monitoring purposes.

After discharge from these series or parallel alternate vessels 26, the flow stream may once again be subjected to gaseous or liquid introductions, ultrasonic energy exposure, and continuous chemical analysis prior to the system return to the primary holding vessel. The primary holding vessel 10 itself may also have the ability for gaseous or liquid introductions, ultrasonic energy exposure, and electromagnetic energy irradiation prior to the cycle starting over again.

At any point the process could be de-pressurized to atmosphere, understanding that additional pumping capabilities and controls would need to be introduced. Not shown, but understood to be a process option is the addition of various other process loops, an example being where beverage is drawn off from any holding vessel and pumped through a separate process loop incorporating any or all of the above steps, and in any combination as desired, adding increased control and system capacity.

The system may be designed for non-batch (i.e., continuous) operation, whereby the levels of individual or total extractives and chemical reaction products are monitored and a continuous stream of completed product diverted once the appropriate levels were reached. New unaged beverage may then be introduced on a continuous basis into the system and individual secondary bed mass containment areas brought into use as extractive depletions occurred in the ones then actively being used and this cycle of depletion and renewal carried out continuously.

Equipment/Process Parameters Used

Multiple laboratory—and small-scale versions of this process were built and used for testing, modeling, and verification purposes and were based on the principles previously described. Different physical arrangements were used at various times depending on the tests performed. A list of the main components used at various times includes:

Holding vessels: 500 ml, 600 ml, 750 ml, 1 gallon, 2 gallon, 5 gallon, 55 gallon volumes Pumps: Pentair Shur-Flo #8005-233-236, Pedrollo PVm 55, Tellarini ALM20, Pedrollo AL-RED 135 m Heat sources: Dido 1500 W single-burner hot plate, 105,000 BTU propane burner Heat exchangers: 3"×8"×12 plate brazed-plate, 5"×12"×10 plate brazed plate Bed mass containment volumes: 3.14 in$^3$, 4.91 in$^3$, 7.07 in$^3$, 12.56 in$^3$, 590 in$^3$ Bed mass immobilization: 1 mesh, 20 mesh, 60 mesh screens Signal generator: Tenma #72-5015

Amplifiers: Crown DC300A, Techron 7560 Modified MRF101AN LF/MF 100 W 0.135 MHz-10.15 MHz Amplifier Ultrasonic transducers: 28 kHz/100 W, 40 kHz/60 W Beijing Ultrasonic 200 kHz/30 W In most cases, the process conditions were typically defined by:
- Beverage temperature of ambient to 170 F
- Beverage flow rates such that batch turnover was a minimum of 1×/minute, usually 5× or more/minute
- Bed masses of 1 g/120 ml of beverage or greater
- Bed nominal particle sizes of 1.3 mm to 10 mm on the longest axis Optional procedures performed include:
- Bed mass containment area, agitation via mechanical vibration, 3 Hz-30 Hz, RMS accelerations of up to 40,000 mm/s$^2$
- Bed mass containment area, mechanical agitation via packed gland reverse-pitch bed auger, 1-30 RPM
- Bed mass containment area, sonication of bed mass via 28 kHz up to 100 W, or 40 kHz up to 60 W
- Atmospheric oxygen provided for oxidation reaction availability at 1 L/minute/2 L of beverage,
  - Injected post-bed mass
  - Sparged in primary holding vessel
    - Inert gas in the form of 100% Argon introduced into primary holding vessel at approximately 0.3 L/minute for oxygen purging and inert-gas blanketing
- Beverage ultrasound exposure, primary holding vessel with approximately one (1) liter active beverage volume, 28 kHz and/or 40 kHz, 200 W-400 W 0.2 MHz at up to 120 W
- Separate or continuous vapor recovery via chilled condensation chamber and liquid return to process The process preferably is periodically checked for change in beverage light transmission percentage using a Hanna Model HI759 colorimeter and these results used to gauge the levels of aging process completion.

Process completion times ranged from 5 minutes to 24 hours, depending on the variables presented. An average processing time was considered to be 1-2 hours. Longer processing times of up to 24 hours were optional depending on levels on the products of the secondary reactions desired, as the extraction processes were generally completed in 6 hours or less. The use of lower amounts of bed mass lessened the bed mass depletion time as well as the total amount of extractives obtained.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A process of aging an ethanol solution comprising the steps of:
   providing an ethanol solution ranging from 1% to 95% alcohol by volume;
   providing a biomass particulate having a size such that said particulate does not exceed 10 mm in its longest dimension, and so that said particulate has a width that does not exceed 5 mm;
   heating said biomass particulate within a range of about 200 F or above;
   reducing said biomass particulate size so that said biomass particulate passes through a 20 mesh screen;
   flowing the ethanol solution through a bed mass containment area that contains said reduced biomass particulate at least once; and
   removing the ethanol solution from said biomass particulate.

2. The process according to claim 1, further including the step of flowing said ethanol solution through said biomass particulate in said bed mass containment area in a continuous flow for a time period of less than 10 hours.

3. The process according to claim 2 wherein the step of flowing the ethanol solution through said bed mass containment area further includes the step of using ultrasonic vibration to agitate said bed of biomass.

4. The process according to claim 2, further including the step of injecting at least one gas into said continuous flow.

5. The process according to claim 2, further including the step of providing a spectroscopic sensor to monitor said continuous flow.

6. The process according to claim 2, further including the step of providing a flow rate meter to monitor said continuous flow.

7. The process according to claim 2 wherein the step of flowing the ethanol solution through said bed mass containment area further includes the step of using mechanical vibration to agitate said bed of biomass.

8. The process according to claim 2, further including the step of providing a chemical sensor to monitor said continuous flow.

9. The process according to claim 1, further including the step of heating said ethanol solution.

10. The process according to claim 1, further including the step of charring said biomass particulate.

11. The process according to claim 1, further including the step of providing multiple bed mass containment areas, so that said flow of ethanol solution is directed through all of said multiple bed mass containment areas.

12. The process according to claim 11, wherein each multiple bed mass containment areas contain different types of biomass particulate.

13. The process according to claim 11, wherein said multiple bed mass containment areas are arranged in parallel.

14. The process according to claim 11, wherein at least one of said bed mass containment areas includes a molecular sieve.

15. The process according to claim 11, wherein at least one of said bed mass containment areas includes a particulate filter.

16. The process according to claim 1, wherein said biomass material comprises wood.

17. The process according to claim 1, wherein said biomass material is selected from the group consisting of charred wood, vegetative biomass, peat, and vanilla bean.

* * * * *